United States Patent
Bulpett et al.

(10) Patent No.: US 10,465,072 B2
(45) Date of Patent: Nov. 5, 2019

(54) GOLF BALLS INCORPORATING DOUBLE NETWORK CROSS-LINKED COMPOSITIONS COMPRISING A BASE THERMOPLASTIC

(71) Applicant: Acushnet Company, Fairhaven, MA (US)

(72) Inventors: David A. Bulpett, Boston, MA (US); Brian Comeau, Berkley, MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

(21) Appl. No.: 15/278,327

(22) Filed: Sep. 28, 2016

(65) Prior Publication Data

US 2018/0085637 A1   Mar. 29, 2018

(51) Int. Cl.
*A63B 37/00* (2006.01)
*C08J 3/24* (2006.01)
*C08L 101/00* (2006.01)
*A63B 45/00* (2006.01)

(52) U.S. Cl.
CPC ........ *C08L 101/00* (2013.01); *A63B 37/0032* (2013.01); *A63B 37/0044* (2013.01); *A63B 37/0063* (2013.01); *C08J 3/244* (2013.01); *A63B 37/0024* (2013.01); *A63B 37/0027* (2013.01); *A63B 37/0039* (2013.01); *A63B 37/0051* (2013.01); *A63B 45/00* (2013.01); *C08L 2205/22* (2013.01)

(58) Field of Classification Search
CPC ......... C08L 2205/22; C08J 3/244; C08J 3/243
See application file for complete search history.

(56) References Cited

U.S. PATENT DOCUMENTS

| | | | |
|---|---|---|---|
| 6,042,489 A | 3/2000 | Renard et al. | |
| 2013/0344992 A1* | 12/2013 | Bulpett | C08L 23/0869 473/371 |

FOREIGN PATENT DOCUMENTS

WO    WO 95/26367    * 10/1995

* cited by examiner

*Primary Examiner* — David J Buttner
(74) *Attorney, Agent, or Firm* — Margaret C. Barker

(57) ABSTRACT

Golf ball comprising at least one layer consisting of a double network cross-linked composition comprising a mixture of a base thermoplastic polymer composition and a double network polymer composition. The double network polymer composition comprises a plurality of particulates of a polymer composition that is elongated from 10% to 200%, or at least 50%, or at least 100% or at least 150% or 200% or greater during a partial cure state.

32 Claims, No Drawings

GOLF BALLS INCORPORATING DOUBLE NETWORK CROSS-LINKED COMPOSITIONS COMPRISING A BASE THERMOPLASTIC

FIELD OF THE INVENTION

Golf balls incorporating stretched materials and methods of making same.

BACKGROUND OF THE INVENTION

Conventional golf balls can be divided into two general classes: solid and wound. Solid golf balls include one-piece, two-piece (i.e., single layer core and single layer cover), and multi-layer (i.e., solid core of one or more layers and/or a cover of one or more layers) golf balls. Wound golf balls typically include a solid, hollow, or fluid-filled center, surrounded by a tensioned elastomeric material, and a cover.

Examples of golf ball materials range from rubber materials, such as balata, styrene butadiene, polybutadiene, or polyisoprene, to thermoplastic or thermoset resins such as ionomers, polyolefins, polyamides, polyesters, polyurethanes, polyureas and/or polyurethane/polyurea hybrids, and blends thereof. Typically, outer layers are formed about the spherical outer surface of an innermost golf ball layer via compression molding, casting, or injection molding.

From the perspective of a golf ball manufacturer, it is desirable to have materials exhibiting a wide range of properties, such as resilience, durability, spin, and "feel," because this enables the manufacturer to make and sell golf balls suited to differing levels of ability and/or preferences. In this regard, playing characteristics of golf balls, such as spin, feel, CoR and compression can be tailored by varying the properties of the golf ball materials and/or adding additional golf ball layers such as at least one intermediate layer disposed between the cover and the core. Intermediate layers can be of solid construction, and have also been formed of a tensioned elastomeric winding. The difference in play characteristics resulting from these different types of constructions can be quite significant.

In one approach, a "stiffer, as opposed to springy" material was produced by stretching cross-linked polymeric bands, skins or bladders and applying same over or about a core. See, e.g., U.S. Pat. No. 6,042,489 of Renard et al. at Col. 2, ll. 24-26. The cross-linked material crystalized under the mechanical tension or strain of stretching and resulted in the stiffer material. See, e.g., *Mechanically-Induced chemical Changes in Polymeric Materials*, Caruso et al, *Chem. Rev.*, Oct. 14, 2009 at § 3.2.1.

However, since there are golfers who prefer a springy rather than stiff feel off the tee, there is still a need for materials that can achieve benefits from stretching without inducing crystallinity within the polymer network. Golf balls of the present invention address and solve this need.

SUMMARY OF THE INVENTION

Accordingly, a golf ball of the invention advantageously has at least one springy rather than stiff thermoset layer that incorporates particulates of a polymer composition that is stretched or elongated while in a partial cure state. In one embodiment, a golf ball of the invention comprises at least one layer consisting of a double network cross-linked composition comprising a mixture of a base thermoplastic polymer composition and a double network polymer composition.

The base thermoplastic polymer composition may comprise, for example, at least one of ionomers; non-ionomeric acid polymers; polyurethanes, polyureas, and polyurethane-polyurea hybrids; polyester-based thermoplastic elastomers; polyamides, copolymers of ionomer and polyamide, polyamide-ethers, and polyamide-esters; ethylene-based homopolymers and copolymers; propylene-based homopolymers and copolymers; triblock copolymers based on styrene and ethylene/butylene; derivatives thereof that are compatibilized with at least one grafted or copolymerized functional group; and combinations thereof.

Meanwhile, the double network polymer composition may comprise a plurality of particulates of a polymer composition that is elongated from 10% to 200% during a partial cure state, or at least 50% during a partial cure state, or at least 100% during the partial cure state, or at least 150% during the partial cure state, or even 200% or greater during the partial cure state.

The polymer composition may comprise, for example, at least one of ionomers; non-ionomeric acid polymers; polyurethanes, polyureas, and polyurethane-polyurea hybrids; polyester-based thermoplastic elastomers; polyamides, copolymers of ionomer and polyamide, polyamide-ethers, and polyamide-esters; ethylene-based homopolymers and copolymers; propylene-based homopolymers and copolymers; triblock copolymers based on styrene and ethylene/butylene; derivatives thereof that are compatibilized with at least one grafted or copolymerized functional group; polybutadiene, ethylene propylene rubber (EPR); ethylene-propylene-diene rubber (EPDM); styrene-butadiene rubber; butyl rubber, halobutyl rubber; polyurethane; polyurea; acrylonitrile butadiene rubber; polychloroprene; alkyl acrylate rubber; polyalkenamer; phenol formaldehyde; melamine formaldehyde; polyepoxide; polysiloxane; polyester; alkyd; polyisocyanurate; polycyanurate; polyacrylate; and combinations thereof.

In one embodiment, the polymer composition may be elongated during a first half of the partial cure state.

The partial cure state may be characterized by a curing time less than T90. In one embodiment, the partial cure state may be characterized by a curing time T60 or less. In another embodiment, the partial cure state may be characterized by a curing time T40 or less.

In one embodiment, the polymer composition is elongated in a single step. In other embodiments, the polymer composition may be elongated in at least two steps.

The plurality of particulates of the polymer composition may be created by chopping, cutting, or grinding, for example.

In one embodiment, a tan delta ratio of the base thermoplastic polymer composition to the double network polymer composition may be greater than 1.0. In other embodiments, this tan delta ratio of base thermoplastic polymer composition to double network polymer composition may be greater than 1.2, or greater than 1.4, or 1.5 or greater, or at least 1.6.

A tan delta ratio of the polymer composition to the double network polymer composition should be greater than 1.0. In other embodiments, this tan delta ratio of polymer composition to double network polymer composition may be greater than 1.2, or greater than 1.4, or 1.5 or greater, or at least 1.6.

Moreover, the double network cross-linked composition may have a flexural modulus that is greater than a flexural modulus of the base thermoplastic polymer composition.

In one embodiment, the at least one layer may be a core layer. In another embodiment, the at least one layer may be an intermediate layer disposed about a thermoset core. In yet another embodiment, the at least one layer may be an intermediate layer disposed about a thermoplastic core. In still another embodiment, the at least one layer may be a cover layer. In an alternative embodiment, the at least one layer may be a coating layer that is formed about an outermost cover layer of the golf ball. Embodiments are also envisioned wherein the at least one layer may be a tie layer that is disposed between and adjacent to two differing golf ball layers that do not comprise the double network cross-linked composition.

In a different embodiment, the at least one layer may comprise a double network cross-linked composition comprising a mixture of a base thermoplastic polymer composition and a double network polymer composition. Or, the at least one layer may consist of a double network cross-linked composition consisting of a mixture of a base thermoplastic polymer composition and a double network polymer composition.

DETAILED DESCRIPTION

A golf ball of the invention incorporates a double network cross-linked composition—a thermoset material that is springy rather than stiff and incorporates a double network composition, namely particulates of a polymer composition that is stretched or elongated while in a partial cure state. Specifically, in one embodiment, the golf ball comprises at least one layer consisting of a double network cross-linked composition comprising a mixture of a base thermoplastic polymer composition and a double network polymer composition.

The base thermoplastic polymer composition may comprise, for example, at least one of ionomers; non-ionomeric acid polymers; polyurethanes, polyureas, and polyurethane-polyurea hybrids; polyester-based thermoplastic elastomers; polyamides, copolymers of ionomer and polyamide, polyamide-ethers, and polyamide-esters; ethylene-based homopolymers and copolymers; propylene-based homopolymers and copolymers; triblock copolymers based on styrene and ethylene/butylene; derivatives thereof that are compatibilized with at least one grafted or copolymerized functional group; and combinations thereof.

The double network polymer composition comprises a plurality of particulates of a polymer composition that has been elongated from 10% to 200% during a partial cure state that has been elongated at least 50% during a partial cure phase, or at least 100% during the partial cure state, or at least 150% during the partial cure state, or even 200% or greater during the partial cure state.

In a preferred embodiment, the polymer composition may be elongated during a first half of the partial cure state. However, embodiments are also envisioned wherein a polymer composition may be elongated during a second half of the partial cure state without producing undesirable crystallization of the polymer network.

The polymer composition may comprise, for example, at least one of ionomers; non-ionomeric acid polymers; polyurethanes, polyureas, and polyurethane-polyurea hybrids; polyester-based thermoplastic elastomers; polyamides, copolymers of ionomer and polyamide, polyamide-ethers, and polyamide-esters; ethylene-based homopolymers and copolymers; propylene-based homopolymers and copolymers; triblock copolymers based on styrene and ethylene/butylene; derivatives thereof that are compatibilized with at least one grafted or copolymerized functional group; polybutadiene, ethylene propylene rubber (EPR); ethylene-propylene-diene rubber (EPDM); styrene-butadiene rubber; butyl rubber, halobutyl rubber; polyurethane; polyurea; acrylonitrile butadiene rubber; polychloroprene; alkyl acrylate rubber; polyalkenamer; phenol formaldehyde; melamine formaldehyde; polyepoxide; polysiloxane; polyester; alkyd; polyisocyanurate; polycyanurate; polyacrylate; and combinations thereof.

Thus, in some embodiments, the polymer composition part of the mixture can be rubber-based. In such embodiments, a desired rubber formulation may be mixed in, either in the conventional manner, or cast in the case of liquid rubber formulations, into a sheet mold, or the stock placed between shims. The rubber in the mold may be compression cured, but at a point in the early to mid-part of the cure, the mold can be opened, and the partially cured rubber is stretched from 10% to 200%, or at least about 50%, or at least 100%, or even 200% or greater. The press platens are closed while the material is elongated and the cure is finished. The sheets that are demolded retain elongation as targeted. These sheets may then be chopped, cut, ground or otherwise reduced into a plurality of particulates of double network polymer composition suitable for mixing or otherwise combining with the base thermoplastic polymer composition and forming golf ball layers.

In other embodiments, the polymer composition part of the mixture can be thermoplastic prior to being elongated and cross-linked—referred to herein as "previously thermoplastic". In such an embodiment, a previously thermoplastic polymer or compounded formulation may be mixed in the conventional manner, in an extruder, injection molding machine or internal mixer or on a mill for instance. The previously thermoplastic compound may then be compression or injection molded, for example, into a sheet or other suitable shape. The material is then cooled, demolded, elongated and then cross-linked after elongation. The material can be cross-linked either chemically using ingredients that are compounded into the previously thermoplastic compound, or by an external means such as radiation or moisture, etc. Following such cross-linking, the previously thermoplastic compound will be thermosetting and may then be chopped, cut, ground or otherwise reduced into a plurality of particulates of double network polymer composition suitable for mixing or otherwise combining with the base thermoplastic polymer composition and forming golf ball layers.

In the case of the compounded-in cure, care must be taken to not impart a significant amount of cross-linking during the first molding step. In one embodiment, the previously thermoplastic compound is elongated from 10% to 200% or at least about 50%, or at least 100%, and in other embodiments, the thermoplastic may be elongated 200% or more before cross-linking is initiated.

The particulates of double network polymer composition are mixed with the base thermoplastic polymer composition prior to molding or otherwise being formed into a golf ball layer. Elongation can increase resilience and modulus of the double network polymer composition which contributes to the properties of the resulting golf ball layer when mixed with the base thermoplastic polymer composition. Meanwhile, the resulting layer is durable due to interactions between the double network cross-linked composition and base thermoplastic polymer composition.

Generally, partial cure is any state below T90 as measured rheometrically. In this regard, T90 is conventionally determined as the time, dependent on the reaction temperature, where the viscosity of the reaction mixture increases by 90% of the value it will attain in the fully cured material. In such a partially cured state, the material can be elongated without full properties being developed until further curing time. Thus, in one embodiment, the partial cure state may be characterized by a curing time less than T90. In another embodiment, the partial cure state may be characterized by a curing time less than T70 (the viscosity of the reaction mixture increases by less than 70% of the value it will attain in the fully cured material). In other embodiments, the partial cure state may be characterized by a curing time T60 or less (the viscosity of the reaction mixture increases by 60% or less of the value it will attain in the fully cured material), or characterized by a curing time less than T60 (the viscosity of the reaction mixture increases by less than 60% of the value it will attain in the fully cured material), or characterized by a curing time T40 or less (the viscosity of the reaction mixture increases by 40% or less of the value it will attain in the fully cured material), or characterized by a curing time less than T40 (the viscosity of the reaction mixture increases by less than 40% of the value it will attain in the fully cured material).

A partial cure state may be achieved by controlling the cure agents, temperatures, pressures, and cure times employed in the cure. For example, in some embodiments, a process employing two cure agents, such as two organic peroxides, with different cure temperature/half-life profiles can allow an initial partial cure at a lower temperature and further curing at higher temperature after the polymer composition has been elongated and molded.

In other embodiments, two different classes of cure agents, such as sulfurs and peroxides, may be used to first provide a partial cure before elongation, molding, and further curing of the polymer composition. Additionally or alternatively, a polymer composition may be first partially cured under lower pressure and/or temperature before being further cured with higher pressure and/or temperature after being elongated in a mold. In some embodiments, a partial cure is obtained by interrupting a cure early in its process once the thermoset polymer composition is partially cured and lightly cross-linked, followed by elongating and molding the composition, prior to curing it further.

In one embodiment, the polymer composition is elongated in a single step. In other embodiments, the polymer composition may be elongated in at least two steps.

The tan delta of two given materials can be used to compare their relative elasticity. A material having a lower tan delta generally means that the material acts more elastic. Tan delta is defined by the equation $E''/E'$, wherein $E'$=storage modulus (a measure of elastic response of a material, measuring stored energy) and $E'$=loss modulus (a measure of viscous response of a material, measuring energy dissipated as heat). Such measurements may be done by a dynamic mechanical analysis technique (DMA) via a DMA tester such as the Q800 from TA Instruments.

In a golf ball of the invention, the base thermoplastic polymer composition can be higher tan delta than the double network polymer composition. Thus, in a mixture of the double network polymer composition and the base thermoplastic polymer composition, the double network polymer composition can contribute or impart greater elasticity to the base thermoplastic polymer composition, with the resulting double network cross-linked composition being more springy and less stiff than a layer that does not contain the particulates of double network polymer composition throughout.

In one embodiment, a tan delta ratio of the base thermoplastic polymer composition to the double network polymer composition is greater than 1.0. In other embodiments, this tan delta ratio of base thermoplastic polymer composition to double network polymer composition may be greater than 1.2, or greater than 1.4, or 1.5 or greater, or at least 1.6.

Of course, embodiments are also envisioned wherein the base thermoplastic composition has a lower tan delta than that of the double network polymer composition, which would provide the flexibility of using base thermoplastic compositions that would otherwise have been too elastic but for mixing same with the higher tan delta double network polymer composition.

Notably, however, the tan delta of the double network polymer composition (elongated polymer composition) will always be lower than the tan delta of the polymer composition provided for elongation during the partial cure state, and therefore always more springy rather than stiffer than prior to stretching or elongation. Thus, a tan delta ratio of the polymer composition to the double network polymer composition will always be greater than 1.0. In other embodiments, this tan delta ratio of polymer composition to double network polymer composition may be greater than 1.2, or greater than 1.4, or 1.5 or greater, or at least 1.6.

Moreover, the double network cross-linked composition may have a flexural modulus that is greater than a flexural modulus of the base thermoplastic polymer composition.

The base thermoplastic polymer composition and double network polymer composition can be mixed via many conventional methods for combining layer ingredients and forming outer golf ball layers about inner layers. In a preferred embodiment, the double network polymer composition should have a melting temperature that is greater than an initial mixing temperature in order to ensure that the particulates can be easily evenly distributed throughout the mixture and the beneficial properties of the elongated particulates are imparted throughout the resulting layer.

Furthermore, the properties of the resulting layer, such as CoR and/or modulus, can be targeted by varying the relative amounts of double network polymer composition (particulates) and base thermoplastic polymer composition in the mixture. For example, the concentration of particulates in the mixture can be predetermined. In one embodiment, the mixture may have a concentration of up to about 20% particulates by weight. In another embodiment, the mixture may have a concentration of from about 5% to about 15% particulates by weight. In yet another embodiment, the mixture may have a concentration of from about 10% to about 40% particulates by weight. In still another embodiment, the mixture may have a concentration of from about 20% to about 60% particulates by weight. In some embodiments, the mixture may even have a concentration of 50% or greater particulates by weight. In an alternative embodiment, the mixture may have a concentration of from about 50% to about 75% particulates by weight.

The total surface area of the particulates added into the mixture can also impact the properties imparted to the resulting layer by the elongated composition. Total surface area of the particulates can be predetermined by selecting the particulate size of the double network polymer composition. Generally, chopping up a given volume of double network polymer composition into a greater number smaller particulates produces a larger combined surface area of double network polymer composition than chopping up the given volume of double network polymer composition into a fewer number of larger particulates. In some embodiments, a greater number of smaller particulates is preferred, whereas in other embodiments, a fewer number of larger particulates may be preferred. Embodiments are also envisioned wherein a combination of both smaller particulates and larger particulates are included in the mixture in various proportions.

Embodiments are likewise envisioned wherein differing particulates are mixed with the base thermoplastic composition—e.g., a first double network polymer composition and a second double network polymer composition that differs from the first are both mixed with the base thermoplastic composition in varying proportions to target a layer property.

In some embodiments, the mixture is at least partially immiscible so that the resulting layer of double network cross-linked composition contains property gradients such as differences in hardness (e.g. Shore C or Shore D), neutralization gradients (percent neutralization, modulus, CoR, etc.

The at least one layer of double network cross-linked composition may be formed about any inner golf ball layer. For example, in one embodiment, the at least one layer may be an outer core layer disposed about an inner core layer. In another embodiment, the at least one layer may be an intermediate layer disposed about a thermoset core. In yet another embodiment, the at least one layer may be an intermediate layer disposed about a thermoplastic core. In still another embodiment, the at least one layer may be a cover layer. In an alternative embodiment, the at least one layer may be a coating layer that is formed about an outermost cover layer of the golf ball. In a different embodiment, the at least one layer may be a tie layer that is disposed between and adjacent to two differing golf ball layers that do not comprise the double network cross-linked composition. Embodiments are indeed envisioned however, wherein the at least one layer is an innermost golf ball layer such as a spherical inner core.

Golf balls of the invention as a whole may comprise a core, a cover and, optionally, at least one intermediate layer disposed concentrically adjacent to the core between the core and the cover. The core may be single or a multi-layered and the cover may also comprise one or more layers. At least one of portion of the golf ball, i.e., core, cover, optional intermediate layer, coating layer and/or a tie-layer comprises the double network cross-linked composition.

Meanwhile, in a golf ball of the invention incorporating a layer of double network cross-linked composition, an overall golf ball coefficient of restitution (CoR) may be targeted by coordinating the CoR of each subassembly of the golf ball. In this regard, a subassembly of any layer refers to that layer plus all the inner layers disposed within/underneath that layer. In this fashion, the center, the intermediate layers and the cover layer may be constructed to have different CoR's. And it is envisioned that a golf ball of the invention may be formulated and constructed to have any desired overall golf ball CoR.

The CoR is a measure of the resilience of a golf ball. A relatively high golf ball CoR allows the golf ball to reach high velocity when struck by a golf club. Thus, the ball tends to travel a greater distance which is particularly important for driver shots off the tee. At the same time, it is often desirable that a golf ball exhibit a soft and comfortable feel. Players can then experience a better sense of control and natural feeling when making the shot. In this regard, the coefficient of restitution or CoR of a golf ball or golf ball subassembly (for example, a golf ball core) is the ratio of the relative velocity of an elastic sphere after direct impact to that before impact. CoR can therefore vary from 0 to 1, with 1 being equivalent to a perfectly or completely elastic collision and 0 being equivalent to a perfectly or completely inelastic collision. The CoR is determined according to a known procedure, wherein the golf ball or golf ball subassembly is fired from an air cannon at two given velocities and a velocity of 125 ft/s is used for the calculations. Ballistic light screens are located between the air cannon and steel plate at a fixed distance to measure ball velocity. As the ball travels toward the steel plate, it activates each light screen and the ball's time period at each light screen is measured. This provides an incoming transit time period which is inversely proportional to the ball's incoming velocity. The ball makes impact with the steel plate and rebounds so it passes again through the light screens. As the rebounding ball activates each light screen, the ball's time period at each screen is measured. This provides an outgoing transit time period which is inversely proportional to the ball's outgoing velocity. The CoR is then calculated as the ratio of the ball's outgoing transit time period to the ball's incoming transit time period ($CoR=V_{out}/V_{in}=T_{in}/T_{out}$).

Thus, in one non-limiting example, a golf ball of the invention comprises a first subassembly, surrounded by a second subassembly which includes a layer of double network cross-linked composition. The first subassembly has a first coefficient of restitution that is less than a second coefficient of restitution of the second subassembly. Meanwhile, the golf ball as a whole, which also includes a cover disposed about the second subassembly, has a ball coefficient of restitution that is greater than the first coefficient of restitution and less than the second coefficient of restitution. The first subassembly can be, for example, a single core, or a dual core, or a core surrounded by an intermediate layer, or even a core, intermediate layer and inner cover layer, combined. In turn, the layer of double network cross-linked composition can be any golf ball layer as desired to achieve or target playing characteristics.

In an alternative embodiment, the at least one layer may comprise the double network cross-linked composition comprising the mixture of a base thermoplastic polymer composition and a double network polymer composition. In a different embodiment, the at least one layer may consist of a double network cross-linked composition consisting of the mixture of a base thermoplastic polymer composition and a double network polymer composition.

A golf ball of the invention may otherwise be constructed of any known number of other layers formed from conventional golf ball materials and having any known diameter and/or thickness, hardness, compression and/or other golf ball properties, which, when coordinated with the at least one layer of double network cross-linked composition, may target particular desired playing characteristics.

For example, in one particular embodiment of a golf ball of the invention, the innermost golf ball layer of a golf ball of the invention may be a conventional rubber-containing inner core, wherein the base rubber may be selected from polybutadiene rubber, polyisoprene rubber, natural rubber, ethylene-propylene rubber, ethylene-propylene diene rubber, styrene-butadiene rubber, and combinations of two or more thereof. A preferred base rubber is polybutadiene. Another preferred base rubber is polybutadiene optionally mixed with one or more elastomers selected from polyisoprene rubber, natural rubber, ethylene propylene rubber, ethylene propylene diene rubber, styrene-butadiene rubber, polystyrene elastomers, polyethylene elastomers, polyurethane elastomers, polyurea elastomers, metallocene-catalyzed elastomers, and plastomers.

Suitable curing processes include, for example, peroxide curing, sulfur curing, radiation, and combinations thereof. In one embodiment, the base rubber is peroxide cured. Organic peroxides suitable as free-radical initiators include, for example, dicumyl peroxide; n-butyl-4,4-di(t-butylperoxy) valerate; 1,1-di(t-butylperoxy)3,3,5-trimethylcyclohexane; 2,5-dimethyl-2,5-di(t-butylperoxy) hexane; di-t-butyl peroxide; di-t-amyl peroxide; t-butyl peroxide; t-butyl cumyl peroxide; 2,5-dimethyl-2,5-di(t-butylperoxy)hexyne-3; di(2-t-butyl-peroxyisopropyl)benzene; dilauroyl peroxide; dibenzoyl peroxide; t-butyl hydroperoxide; and combinations thereof. Peroxide free-radical initiators are generally present in the rubber compositions in an amount within the range of 0.05 to 15 parts, preferably 0.1 to 10 parts, and more preferably 0.25 to 6 parts by weight per 100 parts of the base rubber. Cross-linking agents are used to cross-link at least a portion of the polymer chains in the composition. Suitable cross-linking agents include, for example, metal salts of unsaturated carboxylic acids having from 3 to 8 carbon atoms; unsaturated vinyl compounds and polyfunctional monomers (e.g., trimethylolpropane trimethacrylate); phenylene bismaleimide; and combinations thereof. Particularly suitable metal salts include, for example, one or more metal salts of acrylates, diacrylates, methacrylates, and dimethacrylates, wherein the metal is selected from magnesium, calcium, zinc, aluminum, lithium, and nickel. In a particular embodiment, the cross-linking agent is selected from zinc salts of acrylates, diacrylates, methacrylates, and dimethacrylates. When the cross-linking agent is zinc diacrylate and/or zinc dimethacrylate, the agent typically is included in the rubber composition in an amount within the range of 1 to 60 parts, preferably 5 to 50 parts, and more preferably 10 to 40 parts, by weight per 100 parts of the base rubber.

In a preferred embodiment, the cross-linking agent used in the rubber composition of the core and epoxy composition of the intermediate layer and/or cover layer is zinc diacrylate ("ZDA"). Adding the ZDA curing agent to the rubber composition makes the core harder and improves the resiliency/CoR of the ball. Adding the same ZDA curing agent epoxy composition makes the intermediate and cover layers harder and more rigid. As a result, the overall durability, toughness, and impact strength of the ball is improved.

Sulfur and sulfur-based curing agents with optional accelerators may be used in combination with or in replacement of the peroxide initiators to cross-link the base rubber. High energy radiation sources capable of generating free-radicals may also be used to cross-link the base rubber. Suitable examples of such radiation sources include, for example, electron beams, ultra-violet radiation, gamma radiation, X-ray radiation, infrared radiation, heat, and combinations thereof.

The rubber compositions may also contain "soft and fast" agents such as a halogenated organosulfur, organic disulfide, or inorganic disulfide compound. Particularly suitable halogenated organosulfur compounds include, but are not limited to, halogenated thiophenols. Preferred organic sulfur compounds include, but not limited to, pentachlorothiophenol ("PCTP") and a salt of PCTP. A preferred salt of PCTP is ZnPCTP. A suitable PCTP is sold by the Struktol Company (Stow, Ohio) under the tradename, A 95. ZnPCTP is commercially available from eChinaChem Inc. (San Francisco, Calif.). These compounds also may function as cis-to-trans catalysts to convert some cis-1,4 bonds in the polybutadiene to trans-1,4 bonds. Peroxide free-radical initiators are generally present in the rubber compositions in an amount within the range of 0.05 to 10 parts and preferably 0.1 to 5 parts. Antioxidants also may be added to the rubber compositions to prevent the breakdown of the elastomers. Other ingredients such as accelerators (for example, tetra methylthiurams), processing aids, processing oils, dyes and pigments, wetting agents, surfactants, plasticizers, as well as other additives known in the art may be added to the composition. Generally, the fillers and other additives are present in the rubber composition in an amount within the range of 1 to 70 parts by weight per 100 parts of the base rubber. The core may be formed by mixing and forming the rubber composition using conventional techniques. Of course, embodiments are also envisioned wherein outer layers comprise such rubber-based compositions However, core layers, intermediate/casing layers, and cover layers may additionally or alternatively be formed from other conventional materials such as an ionomeric material including ionomeric polymers, preferably highly-neutralized ionomers (HNP). In another embodiment, the intermediate layer of the golf ball is formed from an HNP material or a blend of HNP materials. The acid moieties of the HNP's, typically ethylene-based ionomers, are preferably neutralized greater than about 70%, more preferably greater than about 90%, and most preferably at least about 100%. The HNP's can be also be blended with a second polymer component, which, if containing an acid group, may also be neutralized. The second polymer component, which may be partially or fully neutralized, preferably comprises ionomeric copolymers and terpolymers, ionomer precursors, thermoplastics, polyamides, polycarbonates, polyesters, polyurethanes, polyureas, polyurethane/urea hybrids, thermoplastic elastomers, polybutadiene rubber, balata, metallocene-catalyzed polymers (grafted and non-grafted), single-site polymers, high-crystalline acid polymers, cationic ionomers, and the like. HNP polymers typically have a material hardness of between about 20 and about 80 Shore D, and a flexural modulus of between about 3,000 psi and about 200,000 psi.

Non-limiting examples of suitable ionomers include partially neutralized ionomers, blends of two or more partially neutralized ionomers, highly neutralized ionomers, blends of two or more highly neutralized ionomers, and blends of one or more partially neutralized ionomers with one or more highly neutralized ionomers. Methods of preparing ionomers are well known, and are disclosed, for example, in U.S. Pat. No. 3,264,272, the entire disclosure of which is hereby incorporated herein by reference. The acid copolymer can be a direct copolymer wherein the polymer is polymerized by adding all monomers simultaneously, as disclosed, for example, in U.S. Pat. No. 4,351,931, the entire disclosure of which is hereby incorporated herein by reference. Alternatively, the acid copolymer can be a graft copolymer wherein a monomer is grafted onto an existing polymer, as disclosed, for example, in U.S. Patent Application Publication No. 2002/0013413, the entire disclosure of which is hereby incorporated herein by reference.

Examples of suitable partially neutralized acid polymers include, but are not limited to, Surlyn® ionomers, commercially available from E. I. du Pont de Nemours and Company; AClyn® ionomers, commercially available from Honeywell International Inc.; and Iotek® ionomers, commercially available from Exxon Mobil Chemical Company. Some suitable examples of highly neutralized ionomers (HNP) are DuPont® HPF 1000 and DuPont® HPF 2000, ionomeric materials commercially available from E. I. du Pont de Nemours and Company. In some embodiments, very low modulus ionomer-("VLMI-") type ethylene-acid polymers are particularly suitable for forming the HNP, such as Surlyn® 6320, Surlyn® 8120, Surlyn® 8320, and Surlyn® 9320, commercially available from E. I. du Pont de Nemours and Company.

It is meanwhile envisioned that in some embodiments/ golf ball constructions, it may be beneficial to also include at least one layer formed from or blended with a conventional isocyante-based material. The following conventional compositions as known in the art may be incorporated to achieve particular desired golf ball characteristics:

(1) Polyurethanes, such as those prepared from polyols and diisocyanates or polyisocyanates and/or their prepolymers, and those disclosed in U.S. Pat. Nos. 5,334,673 and 6,506,851;

(2) Polyureas, such as those disclosed in U.S. Pat. Nos. 5,484,870 and 6,835,794; and (3) Polyurethane/urea hybrids, blends or copolymers comprising urethane and urea segments such as those disclosed in U.S. Pat. No. 8,506,424.

Suitable polyurethane compositions comprise a reaction product of at least one polyisocyanate and at least one curing agent. The curing agent can include, for example, one or more polyols. The polyisocyanate can be combined with one or more polyols to form a prepolymer, which is then combined with the at least one curing agent. Thus, the polyols described herein are suitable for use in one or both components of the polyurethane material, i.e., as part of a prepolymer and in the curing agent. Suitable polyurethanes are described in U.S. Pat. No. 7,331,878, which is incorporated herein in its entirety by reference.

In general, polyurea compositions contain urea linkages formed by reacting an isocyanate group (—N=C=O) with an amine group (NH or $NH_2$). The chain length of the polyurea prepolymer is extended by reacting the prepolymer with an amine curing agent. The resulting polyurea has elastomeric properties, because of its "hard" and "soft" segments, which are covalently bonded together. The soft, amorphous, low-melting point segments, which are formed from the polyamines, are relatively flexible and mobile, while the hard, high-melting point segments, which are formed from the isocyanate and chain extenders, are relatively stiff and immobile. The phase separation of the hard and soft segments provides the polyurea with its elastomeric resiliency. The polyurea composition contains urea linkages having the following general structure:

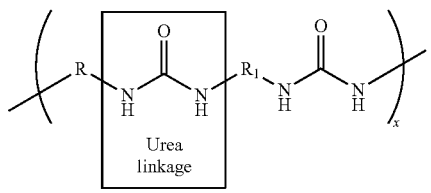

Urea linkage where x is the chain length, i.e., about 1 or greater, and R and $R_1$ are straight chain or branched hydrocarbon chains having about 1 to about 20 carbon atoms.

A polyurea/polyurethane hybrid composition is produced when the polyurea prepolymer (as described above) is chain-extended using a hydroxyl-terminated curing agent. Any excess isocyanate groups in the prepolymer will react with the hydroxyl groups in the curing agent and create urethane linkages. That is, a polyurea/polyurethane hybrid composition is produced.

In a preferred embodiment, a pure polyurea composition, as described above, is prepared. That is, the composition contains only urea linkages. An amine-terminated curing agent is used in the reaction to produce the pure polyurea composition. However, it should be understood that a polyurea/polyurethane hybrid composition also may be prepared in accordance with this invention as discussed above. Such a hybrid composition can be formed if the polyurea prepolymer is cured with a hydroxyl-terminated curing agent. Any excess isocyanate in the polyurea prepolymer reacts with the hydroxyl groups in the curing agent and forms urethane linkages. The resulting polyurea/polyurethane hybrid composition contains both urea and urethane linkages. The general structure of a urethane linkage is shown below:

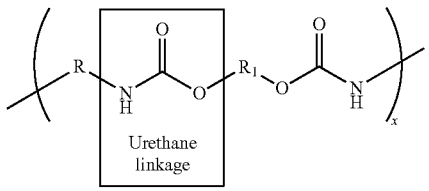

Urethane linkage where x is the chain length, i.e., about 1 or greater, and R and $R_1$ are straight chain or branched hydrocarbon chains having about 1 to about 20 carbon atoms.

There are two basic techniques that can be used to make the polyurea and polyurea/urethane compositions of this invention: a) one-shot technique, and b) prepolymer technique. In the one-shot technique, the isocyanate blend, polyamine, and hydroxyl and/or amine-terminated curing agent are reacted in one step. On the other hand, the prepolymer technique involves a first reaction between the isocyanate blend and polyamine to produce a polyurea prepolymer, and a subsequent reaction between the prepolymer and hydroxyl and/or amine-terminated curing agent. As a result of the reaction between the isocyanate and polyamine compounds, there will be some unreacted NCO groups in the polyurea prepolymer. The prepolymer should have less than 14% unreacted NCO groups. Preferably, the prepolymer has no greater than 8.5% unreacted NCO groups, more preferably from 2.5% to 8%, and most preferably from 5.0% to 8.0% unreacted NCO groups. As the weight percent of unreacted isocyanate groups increases, the hardness of the composition also generally increases.

Either the one-shot or prepolymer method may be employed to produce the polyurea and polyurea/urethane compositions of the invention; however, the prepolymer technique is preferred because it provides better control of the chemical reaction. The prepolymer method provides a more homogeneous mixture resulting in a more consistent polymer composition. The one-shot method results in a mixture that is inhomogeneous (more random) and affords the manufacturer less control over the molecular structure of the resultant composition.

In the casting process, the polyurea and polyurea/urethane compositions can be formed by chain-extending the polyurea prepolymer with a single curing agent or blend of curing agents as described further below. The compositions of the present invention may be selected from among both castable thermoplastic and thermoset materials. Thermoplastic polyurea compositions are typically formed by reacting the isocyanate blend and polyamines at a 1:1 stoichiometric ratio. Thermoset compositions, on the other hand, are cross-linked polymers and are typically produced from the reaction of the isocyanate blend and polyamines at normally a 1.05:1 stoichiometric ratio. In general, thermoset polyurea compositions are easier to prepare than thermoplastic polyureas.

The polyurea prepolymer can be chain-extended by reacting it with a single curing agent or blend of curing agents (chain-extenders). In general, the prepolymer can be reacted with hydroxyl-terminated curing agents, amine-terminated curing agents, or mixtures thereof. The curing agents extend the chain length of the prepolymer and build-up its molecular weight. Normally, the prepolymer and curing agent are mixed so the isocyanate groups and hydroxyl or amine groups are mixed at a 1.05:1.00 stoichiometric ratio.

A catalyst may be employed to promote the reaction between the isocyanate and polyamine compounds for producing the prepolymer or between prepolymer and curing agent during the chain-extending step. Preferably, the catalyst is added to the reactants before producing the prepolymer. Suitable catalysts include, but are not limited to, bismuth catalyst; zinc octoate; stannous octoate; tin catalysts such as bis-butyltin dilaurate, bis-butyltin diacetate, stannous octoate; tin (II) chloride, tin (IV) chloride, bis-butyltin dimethoxide, dimethyl-bis[1-oxonedecyl)oxy]stannane, di-n-octyltin bis-isooctyl mercaptoacetate; amine catalysts such as triethylenediamine, triethylamine, and tributylamine; organic acids such as oleic acid and acetic acid; delayed catalysts; and mixtures thereof. The catalyst is preferably added in an amount sufficient to catalyze the reaction of the components in the reactive mixture. In one embodiment, the catalyst is present in an amount from about 0.001 percent to about 1 percent, and preferably 0.1 to 0.5 percent, by weight of the composition.

The hydroxyl chain-extending (curing) agents are preferably selected from the group consisting of ethylene glycol; diethylene glycol; polyethylene glycol; propylene glycol; 2-methyl-1,3-propanediol; 2-methyl-1,4-butanediol; monoethanolamine; diethanolamine; triethanolamine; monoisopropanolamine; diisopropanolamine; dipropylene glycol; polypropylene glycol; 1,2-butanediol; 1,3-butanediol; 1,4-butanediol; 2,3-butanediol; 2,3-dimethyl-2,3-butanediol; trimethylolpropane; cyclohexyldimethylol; triisopropanolamine; N,N,N',N'-tetra-(2-hydroxypropyl)-ethylene diamine; diethylene glycol bis-(aminopropyl) ether; 1,5-pentanediol; 1,6-hexanediol; 1,3-bis-(2-hydroxyethoxy) cyclohexane; 1,4-cyclohexyldimethylol; 1,3-bis-[2-(2-hydroxyethoxy) ethoxy]cyclohexane; 1,3-bis-{2-[2-(2-hydroxyethoxy) ethoxy]ethoxy}cyclohexane; trimethylolpropane; polytetramethylene ether glycol (PT-MEG), preferably having a molecular weight from about 250 to about 3900; and mixtures thereof.

Suitable amine chain-extending (curing) agents that can be used in chain-extending the polyurea prepolymer of this invention include, but are not limited to, unsaturated diamines such as 4,4'-diamino-diphenylmethane (i.e., 4,4'-methylene-dianiline or "MDA"), m-phenylenediamine, p-phenylenediamine, 1,2- or 1,4-bis(sec-butylamino)benzene, 3,5-diethyl-(2,4- or 2,6-) toluenediamine or "DETDA", 3,5-dimethylthio-(2,4- or 2,6-)toluenediamine, 3,5-diethylthio-(2,4- or 2,6-)toluenediamine, 3,3'-dimethyl-4,4'-diamino-diphenylmethane, 3,3'-diethyl-5,5'-dimethyl4,4'-diamino-diphenylmethane (i.e., 4,4'-methylene-bis(2-ethyl-6-methyl-benezeneamine)), 3,3'-dichloro-4,4'-diamino-diphenylmethane (i.e., 4,4'-methylene-bis(2-chloroaniline) or "MOCA"), 3,3',5,5'-tetraethyl-4,4'-diamino-diphenylmethane (i.e., 4,4'-methylene-bis(2,6-diethylaniline), 2,2'-dichloro-3,3',5,5'-tetraethyl-4,4'-diamino-diphenylmethane (i.e., 4,4'-methylene-bis(3-chloro-2,6-diethyleneaniline) or "MCDEA"), 3,3'-diethyl-5,5'-dichloro-4,4'-diamino-diphenylmethane, or "MDEA"), 3,3'-dichloro-2,2',6,6'-tetraethyl-4,4'-diamino-diphenylmethane, 3,3'-dichloro-4,4'-diamino-diphenylmethane, 4,4'-methylene-bis(2,3-dichloroaniline) (i.e., 2,2',3,3'-tetrachloro-4,4'-diamino-diphenylmethane or "MDCA"), 4,4'-bis(sec-butylamino)-diphenylmethane, N,N'-dialkylamino-diphenylmethane, trimethyleneglycol-di(p-aminobenzoate), polyethyleneglycol-di(p-aminobenzoate), polytetramethyleneglycol-di(p-aminobenzoate); saturated diamines such as ethylene diamine, 1,3-propylene diamine, 2-methyl-pentamethylene diamine, hexamethylene diamine, 2,2,4- and 2,4,4-trimethyl-1,6-hexane diamine, imino-bis(propylamine), imido-bis(propylamine), methylimino-bis(propylamine) (i.e., N-(3-aminopropyl)-N-methyl-1,3-propanediamine), 1,4-bis(3-aminopropoxy)butane (i.e., 3,3'-[1,4-butanediyl-bis-(oxy)bis]-1-propanamine), diethyleneglycol-bis(propylamine) (i.e., diethyleneglycol-di(aminopropyl)ether), 4,7,10-trioxatridecane-1,13-diamine, 1-methyl-2,6-diamino-cyclohexane, 1,4-diamino-cyclohexane, poly(oxyethylene-oxypropylene) diamines, 1,3- or 1,4-bis(methylamino)-cyclohexane, isophorone diamine, 1,2- or 1,4-bis(sec-butylamino)-cyclohexane, N,N'-diisopropyl-isophorone diamine, 4,4'-diamino-dicyclohexylmethane, 3,3'-dimethyl-4,4'-diamino-dicyclohexylmethane, 3,3'-dichloro-4,4'-diamino-dicyclohexylmethane, N,N'-dialkylamino-dicyclohexylmethane, polyoxyethylene diamines, 3,3'-diethyl-5,5'-dimethyl-4,4'-diamino-dicyclohexylmethane, polyoxypropylene diamines, 3,3'-diethyl-5,5'-dichloro-4,4'-diamino-dicyclohexylmethane, polytetramethylene ether diamines, 3,3',5,5'-tetraethyl-4,4'-diamino-dicyclohexylmethane (i.e., 4,4'-methylene-bis(2,6-diethylaminocyclohexane)), 3,3'-dichloro-4,4'-diamino-dicyclohexylmethane, 2,2'-dichloro-3,3',5,5'-tetraethyl-4,4'-diamino-dicyclohexylmethane, (ethylene oxide)-capped polyoxypropylene ether diamines, 2,2',3,3'-tetrachloro-4,4'-diamino-dicyclohexylmethane, 4,4'-bis(sec-butylamino)-dicyclohexylmethane; triamines such as diethylene triamine, dipropylene triamine, (propylene oxide)-based triamines (i.e., polyoxypropylene triamines), N-(2-aminoethyl)-1,3-propylenediamine (i.e., $N_3$-amine), glycerin-based triamines, (all saturated); tetramines such as N,N'-bis(3-aminopropyl)ethylene diamine (i.e., $N_4$-amine) (both saturated), triethylene tetramine; and other polyamines such as tetraethylene pentamine (also saturated). One suitable amine-terminated chain-extending agent is Ethacure 300™ (dimethylthiotoluenediamine or a mixture of 2,6-diamino-3,5-dimethylthiotoluene and 2,4-diamino-3,5-dimethylthiotoluene.) The amine curing agents used as chain extenders normally have a cyclic structure and a low molecular weight (250 or less).

When the polyurea prepolymer is reacted with amine-terminated curing agents during the chain-extending step, as described above, the resulting composition is essentially a pure polyurea composition. On the other hand, when the polyurea prepolymer is reacted with a hydroxyl-terminated curing agent during the chain-extending step, any excess isocyanate groups in the prepolymer will react with the hydroxyl groups in the curing agent and create urethane linkages to form a polyurea/urethane hybrid.

This chain-extending step, which occurs when the polyurea prepolymer is reacted with hydroxyl curing agents, amine curing agents, or mixtures thereof, builds-up the molecular weight and extends the chain length of the prepolymer. When the polyurea prepolymer is reacted with amine curing agents, a polyurea composition having urea linkages is produced. When the polyurea prepolymer is reacted with hydroxyl curing agents, a polyurea/urethane hybrid composition containing both urea and urethane linkages is produced. The polyurea/urethane hybrid composition is distinct from the pure polyurea composition. The concentration of urea and urethane linkages in the hybrid composition may vary. In general, the hybrid composition may contain a mixture of about 10 to 90% urea and about 90 to 10% urethane linkages. The resulting polyurea or polyurea/urethane hybrid composition has elastomeric properties based on phase separation of the soft and hard segments. The soft segments, which are formed from the polyamine reactants, are generally flexible and mobile, while the hard segments, which are formed from the isocyanates and chain extenders, are generally stiff and immobile.

In an alternative embodiment, the cover layer may comprise a conventional polyurethane or polyurethane/urea hybrid composition. In general, polyurethane compositions contain urethane linkages formed by reacting an isocyanate group (—N=C=O) with a hydroxyl group (OH). The polyurethanes are produced by the reaction of a multi-functional isocyanate (NCO—R—NCO) with a long-chain polyol having terminal hydroxyl groups (OH—OH) in the presence of a catalyst and other additives. The chain length of the polyurethane prepolymer is extended by reacting it with short-chain diols (OH—R'—OH). The resulting polyurethane has elastomeric properties because of its "hard" and "soft" segments, which are covalently bonded together. This phase separation occurs because the mainly non-polar, low melting soft segments are incompatible with the polar, high melting hard segments. The hard segments, which are formed by the reaction of the diisocyanate and low molecular weight chain-extending diol, are relatively stiff and immobile. The soft segments, which are formed by the reaction of the diisocyanate and long chain diol, are relatively flexible and mobile. Because the hard segments are covalently coupled to the soft segments, they inhibit plastic flow of the polymer chains, thus creating elastomeric resiliency.

Suitable isocyanate compounds that can be used to prepare the polyurethane or polyurethane/urea hybrid material are described above. These isocyanate compounds are able to react with the hydroxyl or amine compounds and form a durable and tough polymer having a high melting point. The resulting polyurethane generally has good mechanical strength and cut/shear-resistance. In addition, the polyurethane composition has good light and thermal-stability.

When forming a polyurethane prepolymer, any suitable polyol may be reacted with the above-described isocyanate blends in accordance with this invention. Exemplary polyols include, but are not limited to, polyether polyols, hydroxy-terminated polybutadiene (including partially/fully hydrogenated derivatives), polyester polyols, polycaprolactone polyols, and polycarbonate polyols. In one preferred embodiment, the polyol includes polyether polyol. Examples include, but are not limited to, polytetramethylene ether glycol (PTMEG), polyethylene propylene glycol, polyoxypropylene glycol, and mixtures thereof. The hydrocarbon chain can have saturated or unsaturated bonds and substituted or unsubstituted aromatic and cyclic groups. Preferably, the polyol of the present invention includes PTMEG.

In another embodiment, polyester polyols are included in the polyurethane material. Suitable polyester polyols include, but are not limited to, polyethylene adipate glycol; polybutylene adipate glycol; polyethylene propylene adipate glycol; o-phthalate-1,6-hexanediol; poly(hexamethylene adipate) glycol; and mixtures thereof. The hydrocarbon chain can have saturated or unsaturated bonds, or substituted or unsubstituted aromatic and cyclic groups. In still another embodiment, polycaprolactone polyols are included in the materials of the invention. Suitable polycaprolactone polyols include, but are not limited to: 1,6-hexanediol-initiated polycaprolactone, diethylene glycol initiated polycaprolactone, trimethylol propane initiated polycaprolactone, neopentyl glycol initiated polycaprolactone, 1,4-butanediol-initiated polycaprolactone, and mixtures thereof. The hydrocarbon chain can have saturated or unsaturated bonds, or substituted or unsubstituted aromatic and cyclic groups. In yet another embodiment, polycarbonate polyols are included in the polyurethane material of the invention. Suitable polycarbonates include, but are not limited to, polyphthalate carbonate and poly(hexamethylene carbonate) glycol. The hydrocarbon chain can have saturated or unsaturated bonds, or substituted or unsubstituted aromatic and cyclic groups. In one embodiment, the molecular weight of the polyol is from about 200 to about 4000.

In a manner similar to making the above-described polyurea compositions, there are two basic techniques that can be used to make the polyurethane compositions of this invention: a) one-shot technique, and b) prepolymer technique. In the one-shot technique, the isocyanate blend, polyol, and hydroxyl-terminated and/or amine-terminated chain-extender (curing agent) are reacted in one step. On the other hand, the prepolymer technique involves a first reaction between the isocyanate blend and polyol compounds to produce a polyurethane prepolymer, and a subsequent reaction between the prepolymer and hydroxyl-terminated and/or amine-terminated chain-extender. As a result of the reaction between the isocyanate and polyol compounds, there will be some unreacted NCO groups in the polyurethane prepolymer. The prepolymer should have less than 14% unreacted NCO groups. Preferably, the prepolymer has no greater than 8.5% unreacted NCO groups, more preferably from 2.5% to 8%, and most preferably from 5.0% to 8.0% unreacted NCO groups. As the weight percent of unreacted isocyanate groups increases, the hardness of the composition also generally increases.

Either the one-shot or prepolymer method may be employed to produce the polyurethane compositions of the invention. In one embodiment, the one-shot method is used, wherein the isocyanate compound is added to a reaction vessel and then a curative mixture comprising the polyol and curing agent is added to the reaction vessel. The components are mixed together so that the molar ratio of isocyanate groups to hydroxyl groups is in the range of about 1.01:1.00 to about 1.10:1.00. Preferably, the molar ratio is greater than or equal to 1.05:1.00. For example, the molar ratio can be in the range of 1.05:1.00 to 1.10:1.00. In a second embodiment, the prepolymer method is used. In general, the prepolymer technique is preferred because it provides better control of the chemical reaction. The prepolymer method provides a more homogeneous mixture resulting in a more consistent polymer composition. The one-shot method results in a mixture that is inhomogeneous (more random) and affords the manufacturer less control over the molecular structure of the resultant composition.

The polyurethane compositions can be formed by chain-extending the polyurethane prepolymer with a single curing agent (chain-extender) or blend of curing agents (chain-extenders) as described further below. The compositions of the present invention may be selected from among both castable thermoplastic and thermoset polyurethanes. Thermoplastic polyurethane compositions are typically formed by reacting the isocyanate blend and polyols at a 1:1 stoichiometric ratio. Thermoset compositions, on the other hand, are cross-linked polymers and are typically produced from the reaction of the isocyanate blend and polyols at normally a 1.05:1 stoichiometric ratio. In general, thermoset polyurethane compositions are easier to prepare than thermoplastic polyurethanes.

As discussed above, the polyurethane prepolymer can be chain-extended by reacting it with a single chain-extender or blend of chain-extenders. In general, the prepolymer can be reacted with hydroxyl-terminated curing agents, amine-terminated curing agents, and mixtures thereof. The curing agents extend the chain length of the prepolymer and build-up its molecular weight. Normally, the prepolymer and curing agent are mixed so the isocyanate groups and hydroxyl or amine groups are mixed at a 1.05:1.00 stoichiometric ratio.

A catalyst may be employed to promote the reaction between the isocyanate and polyol compounds for producing the polyurethane prepolymer or between the polyurethane prepolymer and chain-extender during the chain-extending step. Preferably, the catalyst is added to the reactants before producing the polyurethane prepolymer. Suitable catalysts include, but are not limited to, the catalysts described above for making the polyurea prepolymer. The catalyst is preferably added in an amount sufficient to catalyze the reaction of the components in the reactive mixture. In one embodiment, the catalyst is present in an amount from about 0.001 percent to about 1 percent, and preferably 0.1 to 0.5 percent, by weight of the composition.

Suitable hydroxyl chain-extending (curing) agents and amine chain-extending (curing) agents include, but are not limited to, the curing agents described above for making the polyurea and polyurea/urethane hybrid compositions. When the polyurethane prepolymer is reacted with hydroxyl-terminated curing agents during the chain-extending step, as described above, the resulting polyurethane composition contains urethane linkages. On the other hand, when the polyurethane prepolymer is reacted with amine-terminated curing agents during the chain-extending step, any excess isocyanate groups in the prepolymer will react with the amine groups in the curing agent. The resulting polyurethane composition contains urethane and urea linkages and may be referred to as a polyurethane/urea hybrid. The concentration of urethane and urea linkages in the hybrid composition may vary. In general, the hybrid composition may contain a mixture of about 10 to 90% urethane and about 90 to 10% urea linkages.

Those layers of golf balls of the invention comprising conventional thermoplastic or thermoset materials may be formed using a variety of conventional application techniques such as compression molding, flip molding, injection molding, retractable pin injection molding, reaction injection molding (RIM), liquid injection molding (LIM), casting, vacuum forming, powder coating, flow coating, spin coating, dipping, spraying, and the like. Conventionally, compression molding and injection molding are applied to thermoplastic materials, whereas RIM, liquid injection molding, and casting are employed on thermoset materials. These and other manufacture methods are disclosed in U.S. Pat. Nos. 6,207,784 and 5,484,870, the disclosures of which are incorporated herein by reference in their entireties.

A method of injection molding using a split vent pin can be found in co-pending U.S. Pat. No. 6,877,974, filed Dec. 22, 2000, entitled "Split Vent Pin for Injection Molding." Examples of retractable pin injection molding may be found in U.S. Pat. Nos. 6,129,881; 6,235,230; and 6,379,138. These molding references are incorporated in their entirety by reference herein. In addition, a chilled chamber, i.e., a cooling jacket, such as the one disclosed in U.S. Pat. No. 6,936,205, filed Nov. 22, 2000, entitled "Method of Making Golf Balls" may be used to cool the compositions of the invention when casting, which also allows for a higher loading of catalyst into the system.

Conventionally, compression molding and injection molding are applied to thermoplastic materials, whereas RIM, liquid injection molding, and casting are employed on thermoset materials. These and other manufacture methods are disclosed in U.S. Pat. Nos. 6,207,784 and 5,484,870, the disclosures of which are incorporated herein by reference in their entirety.

Castable reactive liquid polyurethanes and polyurea materials may be applied over the inner ball using a variety of application techniques such as casting, injection molding spraying, compression molding, dipping, spin coating, or flow coating methods that are well known in the art. In one embodiment, the castable reactive polyurethanes and polyurea material is formed over the core using a combination of casting and compression molding. Conventionally, compression molding and injection molding are applied to thermoplastic cover materials, whereas RIM, liquid injection molding, and casting are employed on thermoset cover materials.

U.S. Pat. No. 5,733,428, the entire disclosure of which is hereby incorporated by reference, discloses a method for forming a polyurethane cover on a golf ball core. Because this method relates to the use of both casting thermosetting and thermoplastic material as the golf ball cover, wherein the cover is formed around the core by mixing and introducing the material in mold halves, the polyurea compositions may also be used employing the same casting process.

For example, once a polyurea composition is mixed, an exothermic reaction commences and continues until the material is solidified around the core. It is important that the viscosity be measured over time, so that the subsequent steps of filling each mold half, introducing the core into one half and closing the mold can be properly timed for accomplishing centering of the core cover halves fusion and achieving overall uniformity. A suitable viscosity range of the curing urea mix for introducing cores into the mold halves is determined to be approximately between about 2,000 cP and about 30,000 cP, or within a range of about 8,000 cP to about 15,000 cP.

To start the cover formation, mixing of the prepolymer and curative is accomplished in a motorized mixer inside a mixing head by feeding through lines metered amounts of curative and prepolymer. Top preheated mold halves are filled and placed in fixture units using centering pins moving into apertures in each mold. At a later time, the cavity of a bottom mold half, or the cavities of a series of bottom mold halves, is filled with similar mixture amounts as used for the top mold halves. After the reacting materials have resided in top mold halves for about 40 to about 100 seconds, preferably for about 70 to about 80 seconds, a core is lowered at a controlled speed into the gelling reacting mixture.

A ball cup holds the shell through reduced pressure (or partial vacuum). Upon location of the core in the halves of the mold after gelling for about 4 to about 12 seconds, the vacuum is released allowing the core to be released. In one embodiment, the vacuum is released allowing the core to be released after about 5 seconds to 10 seconds. The mold halves, with core and solidified cover half thereon, are removed from the centering fixture unit, inverted and mated with second mold halves which, at an appropriate time earlier, have had a selected quantity of reacting polyurea prepolymer and curing agent introduced therein to commence gelling.

Similarly, U.S. Pat. Nos. 5,006,297 and 5,334,673 both also disclose suitable molding techniques that may be utilized to apply the castable reactive liquids employed in the present invention.

However, golf balls of the invention may be made by any known technique to those skilled in the art.

Examples of yet other materials which may be suitable for incorporating and coordinating in order to target and achieve desired playing characteristics or feel include plasticized thermoplastics, polyalkenamer compositions, polyester-based thermoplastic elastomers containing plasticizers, transparent or plasticized polyamides, thiolene compositions, poly-amide and anhydride-modified polyolefins, organic acid-modified polymers, and the like.

Meanwhile, the dimensions of each golf ball component such as the diameter of the core and respective thicknesses of the intermediate layer(s), cover layer(s) and coating layer(s) may be selected and coordinated for targeting and achieving desired playing characteristics or feel. Golf balls made in accordance with this invention can be of any size, although the USGA requires that golf balls used in competition have a diameter of at least 1.68 inches. For play outside of United States Golf Association (USGA) rules, the golf balls can be of a smaller size. Normally, golf balls are manufactured in accordance with USGA requirements and have a diameter in the range of about 1.68 to about 1.80 inches. Also, the USGA has established a maximum weight of 45.93 g (1.62 ounces) for golf balls. For play outside of USGA rules, the golf balls can be heavier.

Golf balls having various constructions may be made in accordance with this invention. For example, golf balls having one-piece, two-piece, three-piece, four-piece, and five or more-piece constructions, with the term "piece" referring to any core, cover or intermediate layer of a golf ball construction, may be made. The term, "layer" as used herein means generally any spherical portion of the golf ball.

In one version, a one-piece ball is made using the inventive composition as the entire golf ball excluding any paint or coating and indicia applied thereon. In a second version, a two-piece ball comprising a single core and a single cover layer is made.

In a third version, a three-piece golf ball contains a dual-layered core and a single-layered cover. The dual-core includes an inner core (center) and surrounding outer core layer. In another version, a three-piece ball contains a single core layer and two cover layers. In yet another version, a four-piece golf ball contains a dual-core and dual-cover (inner cover layer and outer cover layer).

In yet another construction, a four-piece or five-piece golf ball contains a dual-core; an inner cover layer, an intermediate cover layer, and an outer cover layer. In still another construction, a five-piece ball is made containing a three-layered core with an innermost core layer (or center), an intermediate core layer, and outer core layer, and a two-layered cover with an inner and outer cover layer.

The diameter and thickness of the different layers along with properties such as hardness and compression may vary depending upon the construction and desired playing performance properties of the golf ball. Any one or more of the layers of any of the one, two, three, four, or five, or more-piece (layered) balls described above may comprise or consist of a double network cross-linked composition. That is, any of the layers in the core assembly (for example, inner (center), intermediate, and/or outer core layers), and/or any of the layers in the cover assembly (for example, inner, intermediate, and/or outer cover layers) may comprise or consist of a double network cross-linked composition.

Meanwhile, the core may have an overall diameter of from about 1.47 inches (in.) to about 1.62 in., with outer core layers having thicknesses of up to 0.400 or greater; intermediate/casing layer(s) having a thicknesses, for example, of from about 0.025 in. to about 0.057 in.; the core and intermediate/casing layer, combined, having an outer diameter of from about 1.57 in. to about 1.65 in.; covers having a thicknesses of from about 0.015 in. to about 0.055 in.; and coating layers having a combined thickness of from about 0.1 µm to about 100 µm, or from about 2 µm to about 50 µm, or from about 2 µm to about 30 µm. Meanwhile, each coating layer may have a thickness of from about 0.1 µm to about 50 µm, or from about 0.1 µm to about 25 µm, or from about 0.1 µm to about 14 µm, or from about 2 µm to about 9 µm, for example.

In some embodiments, the core may have an overall diameter within a range having a lower limit of 0.500 or 0.700 or 0.750 or 0.800 or 0.850 or 0.900 or 0.950 or 1.000 or 1.100 or 1.150 or 1.200 or 1.250 or 1.300 or 1.350 or 1.400 or 1.450 or 1.500 or 1.600 or 1.610 inches and an upper limit of 1.620 or 1.630 or 1.640 inches. In a particular embodiment, the core is a multi-layer core having an overall diameter within a range having a lower limit of 0.500 or 0.700 or 0.750 or 0.800 or 0.850 or 0.900 or 0.950 or 1.000 or 1.100 or 1.150 or 1.200 inches and an upper limit of 1.250 or 1.300 or 1.350 or 1.400 or 1.450 or 1.500 or 1.600 or 1.610 or 1.620 or 1.630 or 1.640 inches. In another particular embodiment, the multi-layer core has an overall diameter within a range having a lower limit of 0.500 or 0.700 or 0.750 inches and an upper limit of 0.800 or 0.850 or 0.900 or 0.950 or 1.000 or 1.100 or 1.150 or 1.200 or 1.250 or 1.300 or 1.350 or 1.400 or 1.450 or 1.500 or 1.600 or 1.610 or 1.620 or 1.630 or 1.640 inches. In another particular embodiment, the multi-layer core has an overall diameter of 1.500 inches or 1.510 inches or 1.530 inches or 1.550 inches or 1.570 inches or 1.580 inches or 1.590 inches or 1.600 inches or 1.610 inches or 1.620 inches.

The inner core can have an overall diameter of 0.500 inches or greater, or 0.700 inches or greater, or 1.00 inches or greater, or 1.250 inches or greater, or 1.350 inches or greater, or 1.390 inches or greater, or 1.450 inches or greater, or an overall diameter within a range having a lower limit of 0.250 or 0.500 or 0.750 or 1.000 or 1.250 or 1.350 or 1.390 or 1.400 or 1.440 inches and an upper limit of 1.460 or 1.490 or 1.500 or 1.550 or 1.580 or 1.600 inches, or an overall diameter within a range having a lower limit of 0.250 or 0.300 or 0.350 or 0.400 or 0.500 or 0.550 or 0.600 or 0.650 or 0.700 inches and an upper limit of 0.750 or 0.800 or 0.900 or 0.950 or 1.000 or 1.100 or 1.150 or 1.200 or 1.250 or 1.300 or 1.350 or 1.400 inches. In one embodiment, the inner core consists of a single layer formed from a thermoset rubber composition. In another embodiment, the inner core consists of two layers, each of which is formed from the same or different thermoset rubber compositions. In another embodiment, the inner core comprises three or more layers, each of which is formed from the same or different thermoset rubber compositions. In another embodiment, the inner core consists of a single layer formed from a thermoplastic composition. In another embodiment, the inner core consists of two layers, each of which is formed from the same or different thermoplastic compositions. In another embodiment, the inner core comprises three or more layers, each of which is formed from the same or different thermoplastic compositions. In a particular embodiment, the inner core has one or more of the following properties:

a) a center hardness within a range having a lower limit of 20 or 25 or 30 or 35 or 40 or 45 or 50 or 55 Shore C and an upper limit of 60 or 65 or 70 or 75 or 90 Shore C;
b) an outer surface hardness within a range having a lower limit of 20 or 50 or 70 or 75 Shore C and an upper limit of 75 or 80 or 85 or 90 or 95 Shore C;
c) a negative hardness gradient, a zero hardness gradient, or a positive hardness gradient of up to 45 Shore C; and
d) an overall compression of 90 or less, or 80 or less, or 70 or less, or 60 or less, or 50 or less, or 40 or less, or 20 or less, or a compression within a range having a lower limit of 10 or 20 or 30 or 35 or 40 and an upper limit of 50 or 60 or 70 or 80 or 90.

An intermediate core layer can have an overall thickness within a range having a lower limit of 0.005 or 0.010 or 0.015 or 0.020 or 0.025 or 0.030 or 0.035 or 0.040 or 0.045 inches and an upper limit of 0.050 or 0.055 or 0.060 or 0.065 or 0.070 or 0.075 or 0.080 or 0.090 or 0.100 inches. In one embodiment, the intermediate core consists of a single layer formed from a thermoset rubber composition. In another embodiment, the intermediate core consists of two layers, each of which is formed from the same or different thermoset rubber compositions. In another embodiment, the inter-mediate core comprises three or more layers, each of which is formed from the same or different thermoset rubber compositions. In another embodiment, the intermediate core consists of a single layer formed from a thermoplastic composition. In another embodiment, the intermediate core consists of two layers, each of which is formed from the same or different thermoplastic compositions. In another embodiment, the intermediate core comprises three or more layers, each of which is formed from the same or different thermoplastic compositions. In a particular embodiment, the intermediate core has one or more of the following properties:
a) a surface hardness of 25 Shore C or greater, or 40 Shore C or greater, or a surface hardness within a range having a lower limit of 25 or 30 or 35 Shore C and an upper limit of 80 or 85 Shore C;
b) a surface hardness of 60 Shore D or less, or less than 60 Shore D, or 55 Shore D or less, or less than 55 Shore D;
c) a surface hardness within a range having a lower limit of 20 or 30 or 35 or 45 Shore D and an upper limit of 55 or 60 or 65 Shore D;
d) a surface hardness of greater than 60 Shore D;
e) a surface hardness greater than the surface hardness of both the inner core and the outer core.

The outer core layer can have an overall thickness within a range having a lower limit of 0.010 or 0.020 or 0.025 or 0.030 or 0.035 inches and an upper limit of 0.040 or 0.070 or 0.075 or 0.080 or 0.100 or 0.150 inches, or an overall thickness within a range having a lower limit of 0.025 or 0.050 or 0.100 or 0.150 or 0.160 or 0.170 or 0.200 inches and an upper limit of 0.225 or 0.250 or 0.275 or 0.300 or 0.325 or 0.350 or 0.400 or 0.450 or greater than 0.450 inches. The outer core layer may alternatively have a thickness of greater than 0.10 inches, or 0.20 inches or greater, or greater than 0.20 inches, or 0.30 inches or greater, or greater than 0.30 inches, or 0.35 inches or greater, or greater than 0.35 inches, or 0.40 inches or greater, or greater than 0.40 inches, or 0.45 inches or greater, or greater than 0.45 inches, or a thickness within a range having a lower limit of 0.005 or 0.010 or 0.015 or 0.020 or 0.025 or 0.030 or 0.035 or 0.040 or 0.045 or 0.050 or 0.055 or 0.060 or 0.065 or 0.070 or 0.075 or 0.080 or 0.090 or 0.100 or 0.200 or 0.250 inches and an upper limit of 0.300 or 0.350 or 0.400 or 0.450 or 0.500 inches.

In one embodiment, the outer core consists of a single layer formed from a thermoset rubber composition. In another embodiment, the outer core consists of two layers, each of which is formed from the same or different thermoset rubber compositions. In another embodiment, the outer core comprises three or more layers, each of which is formed from the same or different thermoset rubber compositions. In another embodiment, the outer core consists of a single layer formed from a thermoplastic composition. In another embodiment, the outer core consists of two layers, each of which is formed from the same or different thermoplastic compositions. In another embodiment, the outer core comprises three or more layers, each of which is formed from the same or different thermoplastic compositions. In a particular embodiment, the outer core has one or more of the following properties:
a) a thickness of 0.035 inches or 0.040 inches or 0.045 inches or 0.050 inches or 0.055 inches or 0.060 inches or 0.065 inches;
b) a surface hardness of 45 Shore C or greater, or 70 Shore C or greater, or 75 Shore C or greater, or 80 Shore C or greater, or a surface hardness within a range having a lower limit of 45 or 70 or 80 Shore C and an upper limit of 90 or 95 Shore C;
c) a surface hardness greater than the surface hardness of the inner core;
d) a surface hardness less than the surface hardness of the inner core;
e) a surface hardness of 20 Shore C or greater, or 30 Shore C or greater, or 35 Shore C or greater, or 40 Shore C or greater, or a surface hardness within a range having a lower limit of 20 or 30 or 35 or 40 or 50 Shore C and an upper limit of 60 or 70 or 80 Shore C;
f) a surface hardness within a range having a lower limit of 50 or 55 or 60 or 62 or 65 Shore D and an upper limit of 65 or 70 Shore D;
g) is formed from a rubber composition selected from those disclosed in U.S. Patent Application Publication Nos. 2009/0011857 and 2009/0011862, the entire disclosures of which are hereby incorporated herein by reference.

The multi-layer core is enclosed with a cover, which may be a single-, dual-, or multi-layer cover, preferably having an overall thickness within a range having a lower limit of 0.010 or 0.020 or 0.025 or 0.030 or 0.040 or 0.045 inches and an upper limit of 0.050 or 0.060 or 0.070 or 0.075 or 0.080 or 0.090 or 0.100 or 0.150 or 0.200 or 0.300 or 0.500 inches. In a particular embodiment, the cover is a single layer having a thickness of from 0.010 or 0.020 or 0.025 inches to 0.035 or 0.040 or 0.050 inches. In another particular embodiment, the cover consists of an inner cover layer having a thickness of from 0.010 or 0.020 or 0.025 inches to 0.035 or 0.050 inches and an outer cover layer having a thickness of from 0.010 or 0.020 or 0.025 inches to 0.035 or 0.040 inches.

In one embodiment, the cover is a single layer having a surface hardness of 60 Shore D or greater, or 65 Shore D or greater. In a particular aspect of this embodiment, the cover is formed from a composition having a material hardness of 60 Shore D or greater, or 65 Shore D or greater.

In another particular embodiment, the cover is a single layer having a thickness of from 0.010 or 0.020 inches to 0.035 or 0.050 inches and formed from an ionomeric composition having a material hardness of from 60 or 62 or 65 Shore D to 65 or 70 or 72 Shore D.

In another particular embodiment, the cover is a single layer having a thickness of from 0.010 or 0.025 inches to 0.035 or 0.040 inches and formed from a thermoplastic composition selected from ionomer-, polyurethane-, and polyurea-based compositions having a material hardness of 62 Shore D or less, or less than 62 Shore D, or 60 Shore D or less, or less than 60 Shore D, or 55 Shore D or less, or less than 55 Shore D.

In another particular embodiment, the cover is a single layer having a thickness of from 0.010 or 0.025 inches to 0.035 or 0.040 inches and formed from a thermosetting polyurethane- or polyurea-based composition having a material hardness of 62 Shore D or less, or less than 62 Shore D, or 60 Shore D or less, or less than 60 Shore D, or 55 Shore D or less, or less than 55 Shore D.

In another particular embodiment, the cover comprises an inner cover layer formed from an ionomeric composition and an outer cover layer formed from a thermosetting polyurethane- or polyurea-based composition. The inner cover layer composition preferably has a material hardness of from 60 or 62 or 65 Shore D to 65 or 70 or 72 Shore D. The inner cover layer preferably has a thickness within a range having a lower limit of 0.010 or 0.020 or 0.030 inches and an upper limit of 0.035 or 0.040 or 0.050 inches. The outer cover layer composition preferably has a material hardness of 62 Shore D or less, or less than 62 Shore D, or 60 Shore D or less, or less than 60 Shore D, or 55 Shore D or less, or less than 55 Shore D. The outer cover layer preferably has a thickness within a range having a lower limit of 0.010 or 0.020 or 0.025 inches and an upper limit of 0.035 or 0.040 or 0.050 inches.

In another particular embodiment, the cover comprises an inner cover layer formed from an ionomeric composition and an outer cover layer formed from a thermoplastic composition selected from ionomer-, polyurethane-, and polyurea-based compositions. The inner cover layer composition preferably has a material hardness of from 60 or 62 or 65 Shore D to 65 or 70 or 72 Shore D. The inner cover layer preferably has a thickness within a range having a lower limit of 0.010 or 0.020 or 0.030 inches and an upper limit of 0.035 or 0.040 or 0.050 inches. The outer cover layer composition preferably has a material hardness of 62 Shore D or less, or less than 62 Shore D, or 60 Shore D or less, or less than 60 Shore D, or 55 Shore D or less, or less than 55 Shore D. The outer cover layer preferably has a thickness within a range having a lower limit of 0.010 or 0.020 or 0.025 inches and an upper limit of 0.035 or 0.040 or 0.050 inches.

In another particular embodiment, the cover is a dual- or multi-layer cover including an inner or intermediate cover layer formed from an ionomeric composition and an outer cover layer formed from a polyurethane- or polyurea-based composition. The ionomeric layer preferably has a surface hardness of 70 Shore D or less, or 65 Shore D or less, or less than 65 Shore D, or a Shore D hardness of from 50 to 65, or a Shore D hardness of from 57 to 60, or a Shore D hardness of 58, and a thickness within a range having a lower limit of 0.010 or 0.020 or 0.030 inches and an upper limit of 0.045 or 0.080 or 0.120 inches. The outer cover layer is preferably formed from a castable or reaction injection moldable polyurethane, polyurea, or copolymer or hybrid of polyurethane/polyurea. Such cover material is preferably thermosetting, but may be thermoplastic. The outer cover layer composition preferably has a material hardness of 85 Shore C or less, or 45 Shore D or less, or 40 Shore D or less, or from 25 Shore D to 40 Shore D, or from 30 Shore D to 40 Shore D. The outer cover layer preferably has a surface hardness within a range having a lower limit of 20 or 30 or 35 or 40 Shore D and an upper limit of 52 or 58 or 60 or 65 or 70 or 72 or 75 Shore D. The outer cover layer preferably has a thickness within a range having a lower limit of 0.010 or 0.015 or 0.025 inches and an upper limit of 0.035 or 0.040 or 0.045 or 0.050 or 0.055 or 0.075 or 0.080 or 0.115 inches.

In another particular embodiment, the cover comprises an inner cover layer formed from an ionomeric composition and an outer cover layer formed from a thermosetting polyurethane- or polyurea-based composition. The inner cover layer composition preferably has a material hardness of from 60 or 62 or 65 Shore D to 65 or 70 or 72 Shore D. The inner cover layer preferably has a thickness within a range having a lower limit of 0.010 or 0.020 or 0.030 inches and an upper limit of 0.035 or 0.040 or 0.050 inches. The outer cover layer composition preferably has a material hardness of 62 Shore D or less, or less than 62 Shore D, or 60 Shore D or less, or less than 60 Shore D, or 55 Shore D or less, or less than 55 Shore D. The outer cover layer preferably has a thickness within a range having a lower limit of 0.010 or 0.020 or 0.025 inches and an upper limit of 0.035 or 0.040 or 0.050 inches.

In another particular embodiment, the cover comprises an inner cover layer formed from an ionomeric composition and an outer cover layer formed from a thermoplastic composition selected from ionomer-, polyurethane-, and polyurea-based compositions. The inner cover layer composition preferably has a material hardness of from 60 or 62 or 65 Shore D to 65 or 70 or 72 Shore D. The inner cover layer preferably has a thickness within a range having a lower limit of 0.010 or 0.020 or 0.030 inches and an upper limit of 0.035 or 0.040 or 0.050 inches. The outer cover layer composition preferably has a material hardness of 62 Shore D or less, or less than 62 Shore D, or 60 Shore D or less, or less than 60 Shore D, or 55 Shore D or less, or less than 55 Shore D. The outer cover layer preferably has a thickness within a range having a lower limit of 0.010 or 0.020 or 0.025 inches and an upper limit of 0.035 or 0.040 or 0.050 inches.

In another particular embodiment, the cover is a dual- or multi-layer cover including an inner or intermediate cover layer formed from an ionomeric composition and an outer cover layer formed from a polyurethane- or polyurea-based composition. The ionomeric layer preferably has a surface hardness of 70 Shore D or less, or 65 Shore D or less, or less than 65 Shore D, or a Shore D hardness of from 50 to 65, or a Shore D hardness of from 57 to 60, or a Shore D hardness of 58, and a thickness within a range having a lower limit of 0.010 or 0.020 or 0.030 inches and an upper limit of 0.045 or 0.080 or 0.120 inches. The outer cover layer is preferably formed from a castable or reaction injection moldable polyurethane, polyurea, or copolymer or hybrid of polyurethane/polyurea. Such cover material is preferably thermosetting, but may be thermoplastic. The outer cover layer composition preferably has a material hardness of 85 Shore C or less, or 45 Shore D or less, or 40 Shore D or less, or from 25 Shore D to 40 Shore D, or from 30 Shore D to 40 Shore D. The outer cover layer preferably has a surface hardness within a range having a lower limit of 20 or 30 or 35 or 40 Shore D and an upper limit of 52 or 58 or 60 or 65 or 70 or 72 or 75 Shore D. The outer cover layer preferably has a thickness within a range having a lower limit of 0.010 or 0.015 or 0.025 inches and an upper limit of 0.035 or 0.040 or 0.045 or 0.050 or 0.055 or 0.075 or 0.080 or 0.115 inches.

The CoR of each golf ball layer may meanwhile also be targeted and the respective CoRs of the layers coordinated with each other to form an over golf ball possessing/displaying desired playing characteristics. The CoR of a particular golf ball layer may be targeted, for example, to be 0.450 or greater, or 0.475 or greater, or 0.500 or greater, or 0.525 or greater, or 0.550 or greater, or 0.575 or greater, or 0.600 or greater, or 0.625 or greater, or 0.650 or greater, or 0.675 or greater, or 0.700 or greater, or 0.725 or greater, or 0.750 or greater, or 0.800 or greater, or 0.825 or greater, or 0.850 or greater, or 0.825 or greater, or 0.850 or greater, or 0.875 or greater. Embodiments are also envisioned wherein the CoR of a particular layer can be less than 0.450.

The overall coefficient of restitution ("CoR") of some cores of the present invention at 125 ft/s is at least 0.750, or at least 0.775 or at least 0.780, or at least 0.782, or at least 0.785, or at least 0.787, or at least 0.790, or at least 0.795, or at least 0.798, or at least 0.800. Golf balls of the present invention typically have a golf ball CoR of 0.700 or greater, preferably 0.750 or greater, and more preferably 0.780 or greater. Golf balls of the present invention typically have a compression of 40 or greater, or a compression within a range having a lower limit of 50 or 60 and an upper limit of 100 or 120. However, in some embodiments, at least one golf ball layer may have a compression of less than 40.

Golf ball properties such as compression and hardness may be measured as follows. For purposes of the present invention, "compression" refers to Atti compression and is measured according to a known procedure, using an Atti compression test device, wherein a piston is used to compress a ball against a spring. The travel of the piston is fixed and the deflection of the spring is measured. The measurement of the deflection of the spring does not begin with its contact with the ball; rather, there is an offset of approximately the first 1.25 mm (0.05 inches) of the spring's deflection. Very low compression cores will not cause the spring to deflect by more than 1.25 mm and therefore have a zero or negative compression measurement. The Atti compression tester is designed to measure objects having a diameter of 1.680 inches; thus, smaller objects, such as golf ball cores, must be shimmed to a total height of 1.680 inches to obtain an accurate reading. Conversion from Atti compression to Riehle (cores), Riehle (balls), 100 kg deflection, 130-10 kg deflection or effective modulus can be carried out according to the formulas given in *Compression by Any Other Name, Science and Golf IV, Proceedings of the World Scientific Congress of Golf* (Eric Thain ed., Routledge, 2002).

The center hardness of a core is obtained according to the following procedure. The core is gently pressed into a hemispherical holder having an internal diameter approximately slightly smaller than the diameter of the core, such that the core is held in place in the hemispherical portion of the holder while concurrently leaving the geometric central plane of the core exposed. The core is secured in the holder by friction, such that it will not move during the cutting and grinding steps, but the friction is not so excessive that distortion of the natural shape of the core would result. The core is secured such that the parting line of the core is roughly parallel to the top of the holder. The diameter of the core is measured 90 degrees to this orientation prior to securing. A measurement is also made from the bottom of the holder to the top of the core to provide a reference point for future calculations. A rough cut is made slightly above the exposed geometric center of the core using a band saw or other appropriate cutting tool, making sure that the core does not move in the holder during this step. The remainder of the core, still in the holder, is secured to the base plate of a surface grinding machine. The exposed 'rough' surface is ground to a smooth, flat surface, revealing the geometric center of the core, which can be verified by measuring the height from the bottom of the holder to the exposed surface of the core, making sure that exactly half of the original height of the core, as measured above, has been removed to within ±0.004 inches. Leaving the core in the holder, the center of the core is found with a center square and carefully marked and the hardness is measured at the center mark according to ASTM D-2240. Additional hardness measurements at any distance from the center of the core can then be made by drawing a line radially outward from the center mark, and measuring the hardness at any given distance along the line, typically in 2 mm increments from the center. The hardness at a particular distance from the center should be measured along at least two, preferably four, radial arms located 180° apart, or 90° apart, respectively, and then averaged. All hardness measurements performed on a plane passing through the geometric center are performed while the core is still in the holder and without having disturbed its orientation, such that the test surface is constantly parallel to the bottom of the holder, and thus also parallel to the properly aligned foot of the durometer.

Hardness points should only be measured once at any particular geometric location.

The surface hardness of a golf ball layer is obtained from the average of a number of measurements taken from opposing hemispheres, taking care to avoid making measurements on the parting line of the core or on surface defects such as holes or protrusions. Hardness measurements are made pursuant to ASTM D-2240 "Indentation Hardness of Rubber and Plastic by Means of a Durometer." Because of the curved surface of the golf ball layer, care must be taken to ensure that the golf ball or golf ball subassembly is centered under the durometer indentor before a surface hardness reading is obtained. A calibrated digital durometer, capable of reading to 0.1 hardness units, is used for all hardness measurements. The digital durometer must be attached to and its foot made parallel to the base of an automatic stand. The weight on the durometer and attack rate conforms to ASTM D-2240. It should be understood that there is a fundamental difference between "material hardness" and "hardness as measured directly on a golf ball." For purposes of the present invention, material hardness is measured according to ASTM D2240 and generally involves measuring the hardness of a flat "slab" or "button" formed of the material. Surface hardness as measured directly on a golf ball (or other spherical surface) typically results in a different hardness value. The difference in "surface hardness" and "material hardness" values is due to several factors including, but not limited to, ball construction (that is, core type, number of cores and/or cover layers, and the like); ball (or sphere) diameter; and the material composition of adjacent layers. It also should be understood that the two measurement techniques are not linearly related and, therefore, one hardness value cannot easily be correlated to the other.

It is understood that the golf balls of the invention incorporating a double network cross-linked composition, as described and illustrated herein, represent only some of the many embodiments of the invention. It is appreciated by those skilled in the art that various changes and additions can be made to such golf balls without departing from the spirit and scope of this invention. It is intended that all such embodiments be covered by the appended claims.

A golf ball of the invention may also incorporate indicia such as any symbol, letter, group of letters, design, or the like, that can be added to the dimpled surface of a golf ball.

It will be appreciated that any known dimple pattern may be used with any number of dimples having any shape or size. For example, the number of dimples may be 252 to 456, or 330 to 392 and may comprise any width, depth, and edge angle. The parting line configuration of said pattern may be either a straight line or a staggered wave parting line (SWPL).

In any of these embodiments the single-layer core may be replaced with a 2 or more layer core wherein at least one core layer has a hardness gradient.

Other than in the operating examples, or unless otherwise expressly specified, all of the numerical ranges, amounts, values and percentages such as those for amounts of materials and others in the specification may be read as if prefaced by the word "about" even though the term "about" may not expressly appear with the value, amount or range. Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements. Furthermore, when numerical ranges of varying scope are set forth herein, it is contemplated that any combination of these values inclusive of the recited values may be used.

Although the golf ball of the invention has been described herein with reference to particular means and materials, it is to be understood that the invention is not limited to the particulars disclosed and extends to all equivalents within the scope of the claims.

The invention claimed is:

1. A golf ball comprising at least one layer comprising a mixture of a base thermoplastic polymer composition and a plurality of particulates created from a first double network polymer composition having a predetermined total surface area and a second double network polymer composition that differs from the first double network polymer composition and has a predetermined total surface area, wherein each double network polymer composition has been elongated before its cure is finished; and wherein the particulates of the first double network polymer composition and the particulates of the second double network polymer composition are included in the mixture in a proportion sufficient to create at least one property gradient within the layer.

2. The golf ball of claim 1, wherein the base thermoplastic polymer composition comprises at least one of ionomers; non-ionomeric acid polymers; polyurethanes, polyureas, and polyurethane-polyurea hybrids; polyester-based thermoplastic elastomers; polyamides, copolymers of ionomer and polyamide, polyamide-ethers, and polyamide-esters; ethylene-based homopolymers and copolymers; propylene-based homopolymers and copolymers; triblock copolymers based on styrene and ethylene/butylene; derivatives thereof that are compatibilized with at least one grafted or copolymerized functional group; and combinations thereof.

3. The golf ball of claim 2, wherein each double network polymer composition comprises a polymer composition that is elongated from 10% to 200% while partially cured.

4. The golf ball of claim 3, wherein at least one of the double network polymer compositions is elongated at least 50% while partially cured.

5. The golf ball of claim 3, wherein at least one of the double network polymer compositions is elongated at least 100% while partially cured.

6. The golf ball of claim 3, wherein at least one of the double network polymer compositions is elongated at least 150% while partially cured.

7. The golf ball of claim 2, wherein at least one of the double network polymer compositions is elongated 200% or greater while partially cured.

8. The golf ball of claim 3, wherein partial cure is characterized by a curing time of T90 or less.

9. The golf ball of claim 3, wherein partial cure is characterized by a curing time less than T90.

10. The golf ball of claim 3, wherein partial cure is characterized by a curing time T60 or less.

11. The golf ball of claim 3, wherein partial cure is characterized by a curing time T40 or less.

12. The golf ball of claim 3, wherein at least one of the double network polymer compositions is elongated in a single step.

13. The golf ball of claim 3, wherein at least one of the double network polymer compositions is elongated in at least two steps.

14. The golf ball of claim 3, wherein at least one of the double network polymer compositions comprises at least one of ionomers; non-ionomeric acid polymers; polyurethanes, polyureas, and polyurethane-polyurea hybrids; polyester-based thermoplastic elastomers; polyamides, copolymers of ionomer and polyamide, polyamide-ethers, and polyamide-esters; ethylene-based homopolymers and copolymers; propylene-based homopolymers and copolymers; triblock copolymers based on styrene and ethylene/butylene; derivatives thereof that are compatibilized with at least one grafted or copolymerized functional group; polybutadiene, ethylene propylene rubber (EPR); ethylene-propylene-diene rubber (EPDM); styrene-butadiene rubber; butyl rubber, halobutyl rubber; polyurethane; polyurea; acrylonitrile butadiene rubber; polychloroprene; alkyl acrylate rubber; polyalkenamer; phenol formaldehyde; melamine formaldehyde; polyepoxide; polysiloxane; polyester; alkyd; polyisocyanurate; polycyanurate; polyacrylate; and combinations thereof.

15. The golf ball of claim 3, wherein the plurality of particulates is created by at least one of chopping, cutting, or grinding each of the first double network polymer composition and second double network polymer composition after cure is finished.

16. The golf ball of claim 3, wherein a tan delta ratio of the base thermoplastic polymer composition to the total double network polymer compositions is greater than 1.0.

17. The golf ball of claim 3, wherein a tan delta ratio of the base thermoplastic polymer composition to the total double network polymer compositions is greater than 1.2.

18. The golf ball of claim 3, wherein a tan delta ratio of the base thermoplastic polymer composition to the total double network polymer compositions is greater than 1.4.

19. The golf ball of claim 3, wherein a tan delta ratio of the base thermoplastic polymer composition to the total double network polymer compositions is 1.5 or greater.

20. The golf ball of claim 3, wherein a tan delta ratio of the base thermoplastic polymer composition to the total double network polymer compositions is at least 1.6.

21. The golf ball of claim 3, wherein the at least one layer is a core layer.

22. The golf ball of claim 3, wherein the at least one layer is an intermediate layer disposed about a thermoset core.

23. The golf ball of claim 3, wherein the at least one layer is an intermediate layer disposed about a thermoplastic core.

24. The golf ball of claim 3, wherein the at least one layer is a cover layer.

25. The golf ball of claim 3, wherein the at least one layer is a coating layer that is formed about an outermost cover layer of the golf ball.

26. The golf ball of claim 3, wherein the at least one layer is a tie layer that is disposed between and adjacent to two differing golf ball layers that do not comprise any double network composition.

27. The golf ball of claim 1, wherein at least one of the double network polymer compositions does not contain rubber.

28. The golf ball of claim 1, wherein at least one of the double network polymer compositions consists of at least one of ionomers; non-ionomeric acid polymers; polyurethanes, polyureas, and polyurethane-polyurea hybrids; polyester-based thermoplastic elastomers; polyamides, copolymers of ionomer and polyamide, polyamide-ethers, and polyamide-esters; ethylene-based homopolymers and copolymers; propylene-based homopolymers and copolymers; triblock copolymers based on styrene and ethylene/butylene; derivatives thereof that are compatibilized with at least one grafted or copolymerized functional group; polychloroprene; phenol formaldehyde; melamine formaldehyde; polyepoxide; polysiloxane; polyester; alkyd; polyisocyanurate; polycyanurate; polyacrylate; and combinations thereof.

29. The golf ball of claim 1, wherein the property gradient is a difference in Shore D hardness.

30. The golf ball of claim 1, wherein the property gradient is a difference in percent neutralization.

31. The golf ball of claim 1, wherein the property gradient is a difference in modulus.

32. The golf ball of claim 1, wherein the property gradient is a difference in CoR.

* * * * *